(12) United States Patent
Montenegro

(10) Patent No.: US 6,571,289 B1
(45) Date of Patent: *May 27, 2003

(54) CHAINED REGISTRATIONS FOR MOBILE IP

(75) Inventor: Gabriel E. Montenegro, Fremont, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,055

(22) Filed: Aug. 3, 1998

(51) Int. Cl.$^7$ .................................................. G06F 15/16
(52) U.S. Cl. .......................... 709/227; 709/238; 709/245
(58) Field of Search ................................. 709/250, 223, 709/227, 238, 245; 370/251, 252, 401

(56) References Cited

U.S. PATENT DOCUMENTS

| | | | | |
|---|---|---|---|---|
| 5,822,303 A | * | 10/1998 | Carter et al. | 370/246 |
| 6,052,725 A | * | 4/2000 | McCann et al. | 709/223 |
| 6,055,575 A | * | 4/2000 | Paulsen et al. | 709/229 |
| 6,061,650 A | * | 5/2000 | Malkin et al. | 709/228 |
| 6,101,543 A | * | 8/2000 | Alden et al. | 709/229 |
| 6,137,791 A | * | 10/2000 | Frid et al. | 370/352 |
| 6,163,843 A | * | 12/2000 | Inoue et al. | 713/201 |
| 6,233,688 B1 | * | 5/2001 | Montenegro | 713/201 |
| 6,253,326 B1 | * | 6/2001 | Lincke et al. | 713/201 |
| 6,266,704 B1 | * | 7/2001 | Reed et al. | 709/238 |
| 6,487,605 B1 | * | 11/2002 | Leung | 709/245 |
| 2001/0041571 A1 | * | 11/2001 | Yuan | 455/445 |

FOREIGN PATENT DOCUMENTS

| | | | | |
|---|---|---|---|---|
| WO | WO 98 32301 A | | 7/1998 | H04Q/7/22 |
| WO | WO 98/32301 | * | 7/1998 | H04Q/7/22 |

OTHER PUBLICATIONS

Perkins, Charles E. "Mobile–IP, Ad–Hoc Networking, and Nomadicity", IEEE 0730–3157/96, pp. 472–476, 1996.*
Perkins, Charles E. "Mobile IP", IEEE Communications Magazine, pp. 84–99, May 1997.*
Inoue A et al., IP Layer Security and Mobility Support Design Policy and an Implementation, pp. 571–577.
Giovanardi A et al, Transparent Mobile IP: An Approach and Implementation, p. 1861–1865.
Li Y et al, Protocol Architecture for Universal Personal Computing, IEEE Journal on Selected Areas in Communications, vol. 15, No. 8, pp. 1467–1476.

* cited by examiner

*Primary Examiner*—Glenton B. Burgess
*Assistant Examiner*—Bradley Edelman
(74) *Attorney, Agent, or Firm*—Blakely Sokoloff Taylor & Zafman

(57) ABSTRACT

A method for negotiating access to a private network for a mobile node that has migrated beyond the private network. A plurality of tunnel segments are composed with these tunnel segments composing a chain of a registration request from the mobile node to the private network.

8 Claims, 4 Drawing Sheets

REPRESENTATIVE DATA FLOW DIAGRAM

CHAINED REGISTRATIONS FOR MOBILE IP

BACKGROUND OF THE INVENTION

1. Field of the Invention

The invention relates generally to the field of communications. More specifically, the invention relates to computer networking.

2. Description of the Related Art

For mobile access, particularly where a laptop or other mobile information device is used, a designation known as "Mobile IP (Internet Protocol)" has been developed. The Mobiles IP protocol allows a user to "roam" from IP location to IP location by leaving a "forwarding" address where the user may be reached (i.e. where IP packets may be forwarded to), but currently ignores firewalls. Currently, Mobile IP defines three entities—a mobile node, a home agent and a foreign agent. The mobile node is the roaming client that seeks access into the network as if the mobile node were still within its confines in terms of its IP address. Through Mobile IP, the mobile node will be able to use a permanent IP address that it is assigned within the intranet when it is physically "home" regardless of where in terms of actual IP address the mobile node may have moved. Through a process known as registration, a forwarding address is left with the home agent. The home agent intercepts all packets destined for the mobile node and sends them to a "foreign agent" that is currently being visited by the mobile node. By adding another IP header to packets bound for the mobile node, the routing system will view the home agent as the source and the foreign agent as the destination. Once at the foreign agent the packet can be delivered directly via data link mechanisms to the mobile node without resorting to resolving IP headers and without having to perform ordinary network layer routing.

In order for the home agent to have such a relationship with the foreign agent, the home agent and foreign agent must be directly reachable (i.e. without having to first traverse through a firewall or other impeding node). In many instances, such direct access is not desirable or not possible. For instance, if a mobile node is connecting (gaining Internet access) through an ISP (Internet Service Provider) which acts as the foreign agent, then it may be a breach of security to allow the ISP direct access to the home agent which presumably is located in the premises of a private network or intranet. From the standpoint of the private network, granting such access becomes cumbersome since a mobile node may connect through multiple and different ISPs. The problem is magnified when considering that more than one user may be mobile and attempting to gain remote access via a Mobile IP technique.

Mobile IP, as employed in the current state of the art, assumes that a single registration sets up a "tunnel" (i.e., data pathway) between the mobile node and the home agent Mobile IP assumes that the endpoints of the tunnel are mutually-trusting entities that can and are willing to share registration packets. It also assumes that the mobile node initiates the registration request.

However, in the remote access situation where the access is by a mobile node that has migrated outside a firewall, there may be several intervening entities, such as an ISP, which are not secure, trusting entities. Thus, there is a need for a mechanism that can allow a mobile node, regardless of the number, type of intermediary entities to the private network, to obtain a secure registration. Further, in a mobile node that normally obtains its "home" address, i.e., its IP address when within the private network through assignment by a server (such as DHCP), there is needed a home address discovery mechanism when the mobile node migrates beyond the private network.

SUMMARY OF THE INVENTION

A tunneling set-up protocol is defined so that the registration process may be chained in a compound tunnel which is composed of a plurality of segments. Each tunnel segment composes a registration request passing this along to the next tunnel segment until the endpoint is reached, at which point the registration request of a mobile node may be authenticated for data access to the endpoint. Further, a home address discovery mechanism provides a mobile node with the ability to discover its intranet IP address even though it has migrated beyond the intranet.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Mobile IP defines the following terms with regard to remote access:

mobile node: The node attempting to register with the network, on whose behalf a compound tunnel may be established.

home agent: The agent which terminates the compound tunnel, and which encapsulates datagrams for the mobile node. The home agent is part of the network which a mobile node would attempt access to, and which ordinarily encapsulates datagram for the mobile node when that node is located within that network.

Figure 1:
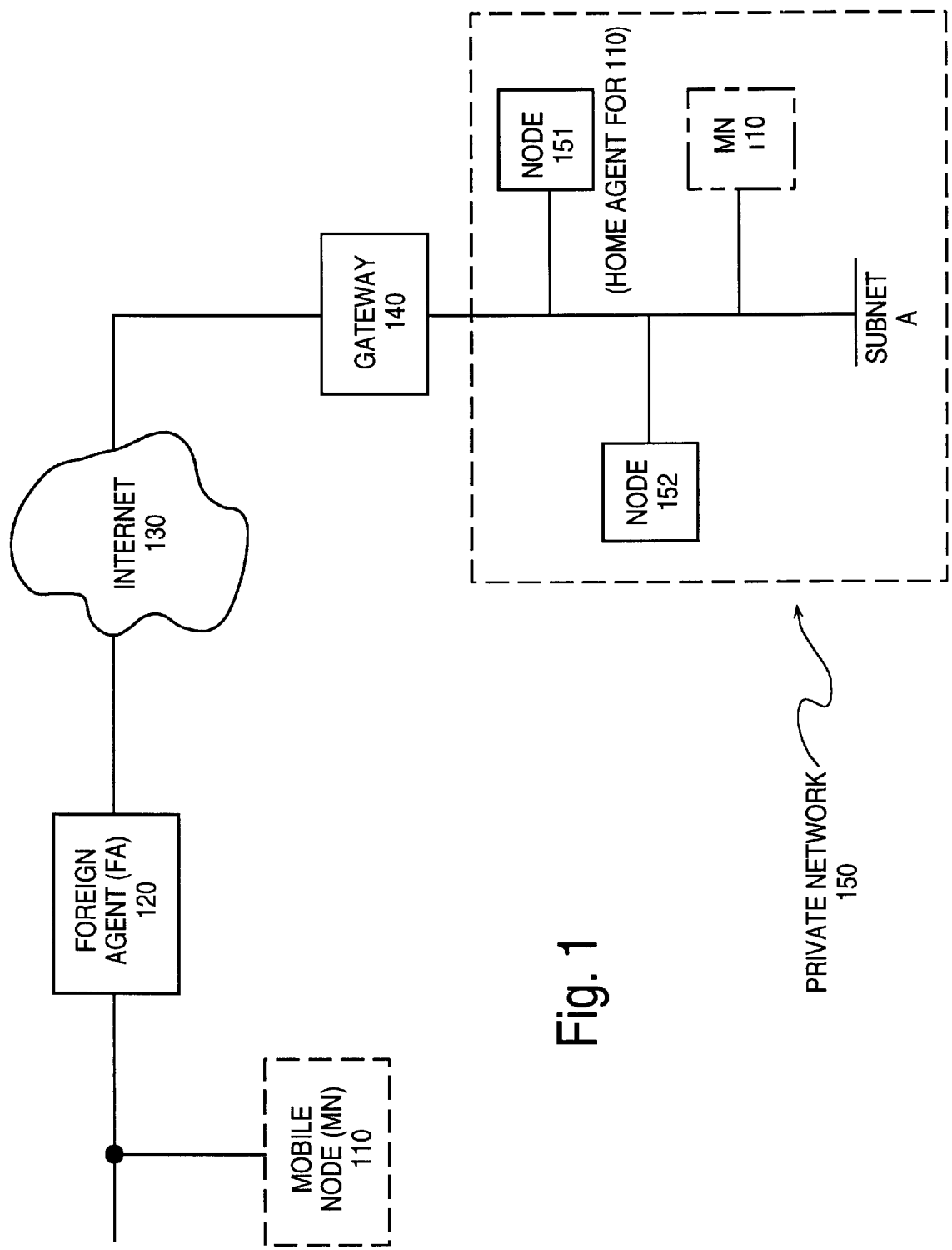
FIG. 1 is a topological diagram illustrating the operation of chained registrations according to at least one embodiment of the invention.

FIG. 1 is a topological diagram illustrating the operation of chained registrations according to at least one embodiment of the invention. A mobile node (MN) 110 may physically migrate from within the premises of a private network 150 to somewhere beyond the private network 150. For instance, MN 110 could be a laptop which is at one point connected to and receives an address from the private network 150. Later, MN 110 may roam somewhere on Internet 130 and thus be outside the segregated confines of the private network 150. When it moves, its actual IP address will no longer be the same as when the MN 110 resided in the private network 150. In attempting to gain access to the private network, a system of registration which is secure and scalable must be provided. The private network 150 is shielded from outside intruders by the use of gateway 140. Gateway 140 is typically a two-way security mechanism that attempts to limit access to the private network and also access from within the private network to the outside. In so doing, the gateway 140 may be responsible for implementing and administering security, acting as proxy and so forth.

In one embodiment of the invention, a chained registration mechanism is provided which operates as follows. MN 110, when it has moved beyond the private network 150, may be connected to the Internet 130 through a Foreign Agent (FA) 120 such as an ISP (Internet Service Provider). The MN 110 will first send a registration request to FA 120 which contains within it information pertaining to a "care-of-address" (COA) and a "home agent address" (HA). In the exemplary topology of FIG. 1, the MN's registration request would identify the gateway 140 to be the HA, because it is the gateway that will identify a home address that is directly reachable from the gateway 140. The request would also contain a COA which shows how the mobile node can be reached. Initially, the MN would be reachable via an IP, address assigned by the ISP (FA 120), and thus the FA 120 is listed as the COA.

The FA 120 is the recipient of the registration request and since it will not be allowed to complete the registration request itself (unless the ISP were somehow given secure access, to the private network 150, which is typically undesirable), the request is forwarded to the gateway 140 which is designated as the HA. The gateway 140 is not a "home agent" as the term is used in the art since it does not belong to the same subnet as the mobile node (the "home agent" usually refers to an address on the same subnet systems in the same subnet can reach each other by link-layer mechanisms, without recourse to routing). The gateway 140 verifies an authentication which would accompany the registration request and also decodes the addressing information within the registration request. Upon decode, the gateway 140 recognizes that it is designated as the home agent. However, this is not really the case. The gateway 140 can check a database from which it determines that a node 151 is the true "home agent" for the MN 110. The MN 110 would have resided within the subnet in the private network with node 151 as its home agent. If so, the gateway 140 when presented with the registration request will initiate an authenticated registration exchange with node 151. Thus, the registration is "chained" from the MN to the gateway and then from the gateway to node 151, the true home agent.

To achieve this chained registration, the gateway 140 composes its own registration request. In this registration request, the home address will be designated as MN, the node 151 will be designated as the home agent (HA) (which it truly is), while the gateway 140 will be designated as the COA. In the special case where the gateway is the true home agent for the MN 110, then secure remote access will be achieved upon the completed processing of the first registration request and the authentication registration exchange which accompanies it. The true home agent (node 151) verifies the authentication for this registration and recognizes its validity. The home agent then is able to establish a secure "tunnel" between the mobile node 110's packets with the gateway 140. This allows data transfer between a "correspondent" node(s) within the private network 150 and the mobile node 110, further illustrated in FIG. 2.

Figure 2:
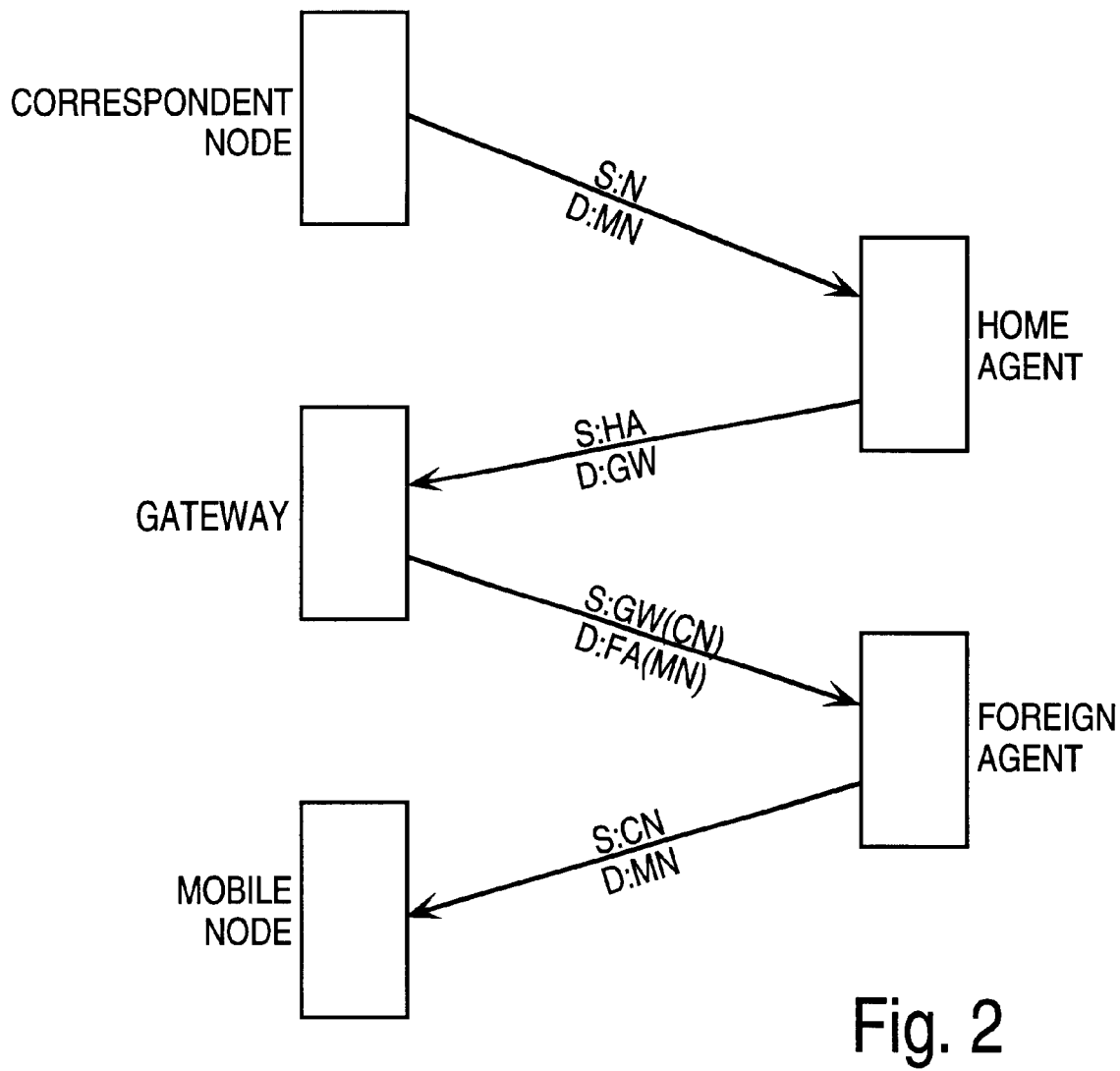
FIG. 2 is a diagram illustrating an exemplary data packet transfer between a mobile node and a correspondent node.

FIG. 2 is a diagram illustrating an exemplary data packet transfer between a mobile node and a correspondent node.

The invention, in various embodiments, permits a mobile node that has migrated outside of the auspices of a private network such as a corporate intranet to communicate with nodes that still reside physically and topologically within the private network (correspondent nodes). When correspondent node (for instance, node 152 in FIG. 1) and mobile node (for instance, mobile node 110 in FIG. 1) desire packet transfer a successful chained registration will first need to occur. After such a registration, data transfer will occur as follows.

When a correspondent node (whose address is CN) desires to send a packet of information to a mobile node (whose address is MN), first, the correspondent node will compose a packet with a source address of CN and destination address of MN. The address MN refers to the address of the mobile node when within the private network, i.e., its permanent home address. The home agent, whose address is designated as HA, is a node within the private network which intercepts this packet link-layer mechanisms like proxy arp and gratuitous arp or additionally by being the router into that subnet and forwards it to the Gateway (whose address is GW). The home agent will pre-pend an additional header which has a source address of HA and a destination address of GW. The gateway then receives this packet and strips the added header to recover the original packet which has a source address of CN and destination address of MN. The gateway will recognize that MN has a "binding" (i.e., a stamp indicating a valid registration) with a current address of FA.

The discovery of a binding causes the gateway to respond by pre-pending its own IP header to the packet that has as source the address GW and as destination the address FA, which is the address of the foreign agent (see FIG. 1). The foreign agent obtains the packet, strips this pre-pended header and recovers the original packet with source address CN and destination address MN. The foreign agent recognizes that the packet has the valid binding or registration and forwards the packet to the mobile node without additional overhead. The foreign agent can directly reach the mobile node (by virtue of the mobile node pre-establishing a link-layer connection with the foreign agent) and thus, does not need any additional header for routing. The mobile node receives the packet with the original source CN and destination address MN specified, and without any additional addressing headers. Thus, mobility is transparent; the mobile node receives the packet as if it were still physically part of the private network. The process of chained registration lends a topological credibility to the mobile node with regard to the private network which the mobile node had lost by being physically outside the private network.

Figure 3:
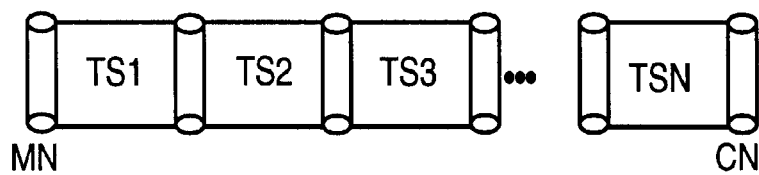
FIG. 3 is a diagram illustrating the extensibility of a chained registration technique.

FIG. 3 is a diagram illustrating the extensibility of a chained registration technique.

In the chain of registrations described above with respect to FIGS. 1 and 2, two separate "tunnel segments" are created to compose the compound tunnel between the mobile node and the home agent. The first tunnel segment is created between the FA and the gateway while the second is composed between gateway and home agent. A chained registration is possible with many such tunnel segments, as shown in FIG. 3. The tunnel between home agent and mobile node is composed of N tunnel segments. Each segment starting node may pre-pend an addressing header which is then stripped by the segment ending node to recover the original packet header.

Figure 4:
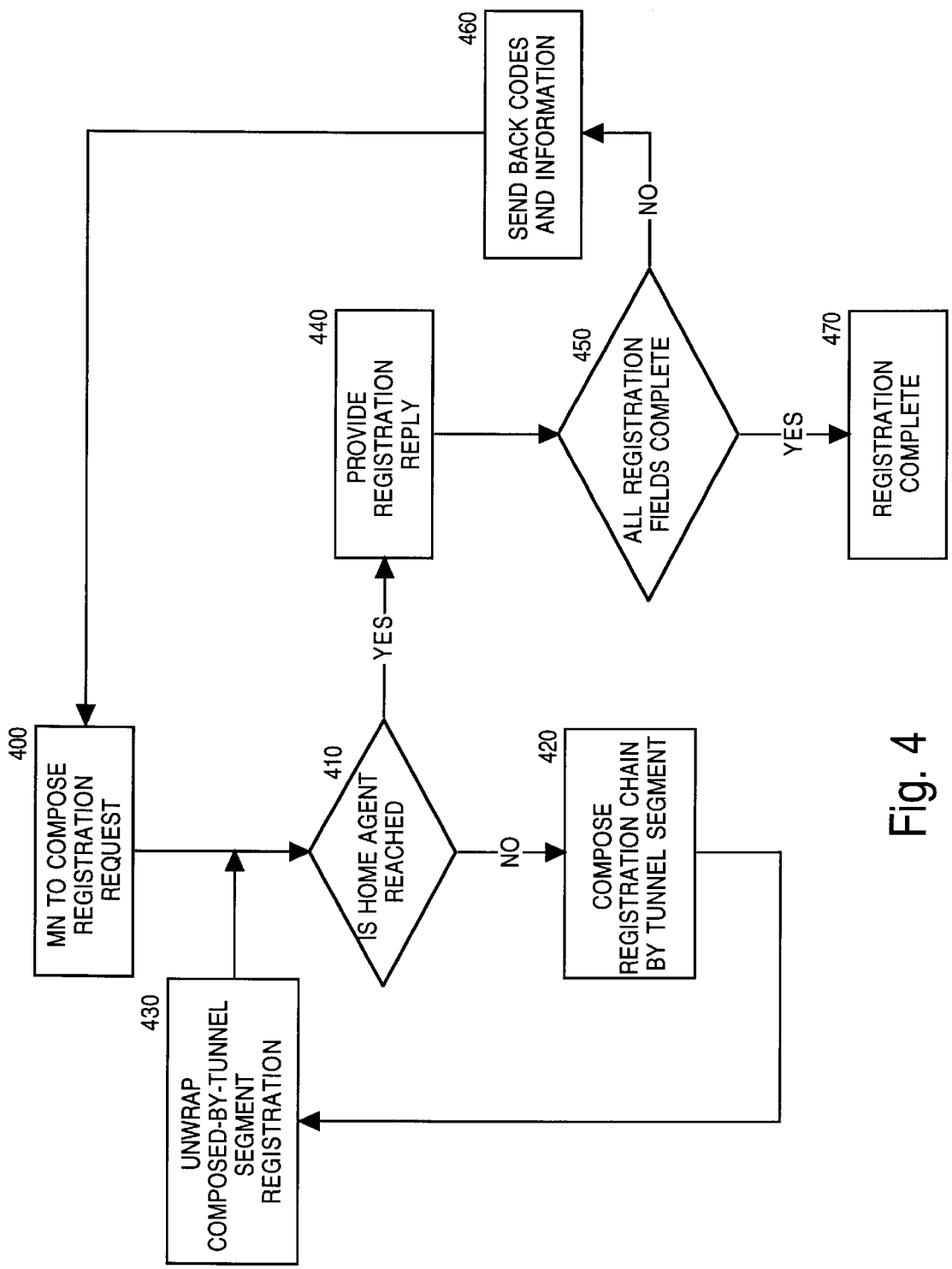
FIG. 4 is a flowchart of the chained registration technique according to at least one embodiment of the invention.

FIG. 4 is a flowchart of the chained registration technique according to at least one embodiment of the invention.

According to step 400, the first step in chained registration is that the MN (mobile node) should compose a registration request on its own behalf. If the home agent is reached, i.e., if the registration request indicates that the destination address is true home agent (step 410) then and only then would a registration reply be provided (step 440). If not, then according to step 420, the registration chain will be composed by the tunnel segment. Each tunnel segment will in turn compose registrations "chaining" their way until the home agent is reached (checked at step 410). When each registration chain is composed, the next segment will unwrap the registration to check for the home agent as the destination address. When the home agent is reached, a registration reply is provided (step 440).

After the registration reply is provided, it is checked for completeness by accessing certain fields and headers (step 450). If not, then the home agent will provide back to the mobile node the codes and information necessary to form a complete registration request. Such information may include the home address for the mobile node or discovery of a dynamic home agent address (step 460). If all registration fields are complete (checked at step 450), then the registration process is also considered complete (step 470).

SECURITY

Authenticating Registrations

In the example above, a second registration was created by the gateway and sent to the home agent. From the home agent's point of view, this registration request is the same as what it would have received from the MN directly; the mobile node is considered to be "at" the gateway.

However, from the standpoint of security, it may be desirable to make explicit which network entity composes the packet. This dictates which security association is used to verify the authentication field in the registration. For instance, a registration request composed by the mobile node to its home agent directly should be authenticated using a security association common to those two entities. On the other hand, a surrogate registration request composed by the gateway to the home agent on behalf of the MN, should be authenticated using a security association common to the gateway and the home agent.

The creator of the registration request should be provided with a mechanism to indicate which security association should be used. For example, registration request composed by the gateway on behalf of the mobile node looks just like one issued by the mobile node itself.

An "SPI" (Security Parameters Index) has been provided in the mobile IP standard to refer to the security association with which a packet must be processed at the destination node and defines which security association is to be used between systems.

The SPI is an arbitrary 32-bit value that identifies the security association for a datagram, relative to the destination IP address (such as the mobile node IP) contained in the IP header with which this security header is associated, and relative to the security protocol (such as chained mobile registration) employed. A security association can be guaranteed by referring to the SPI, the destination address and the security protocol.

Figure 5:
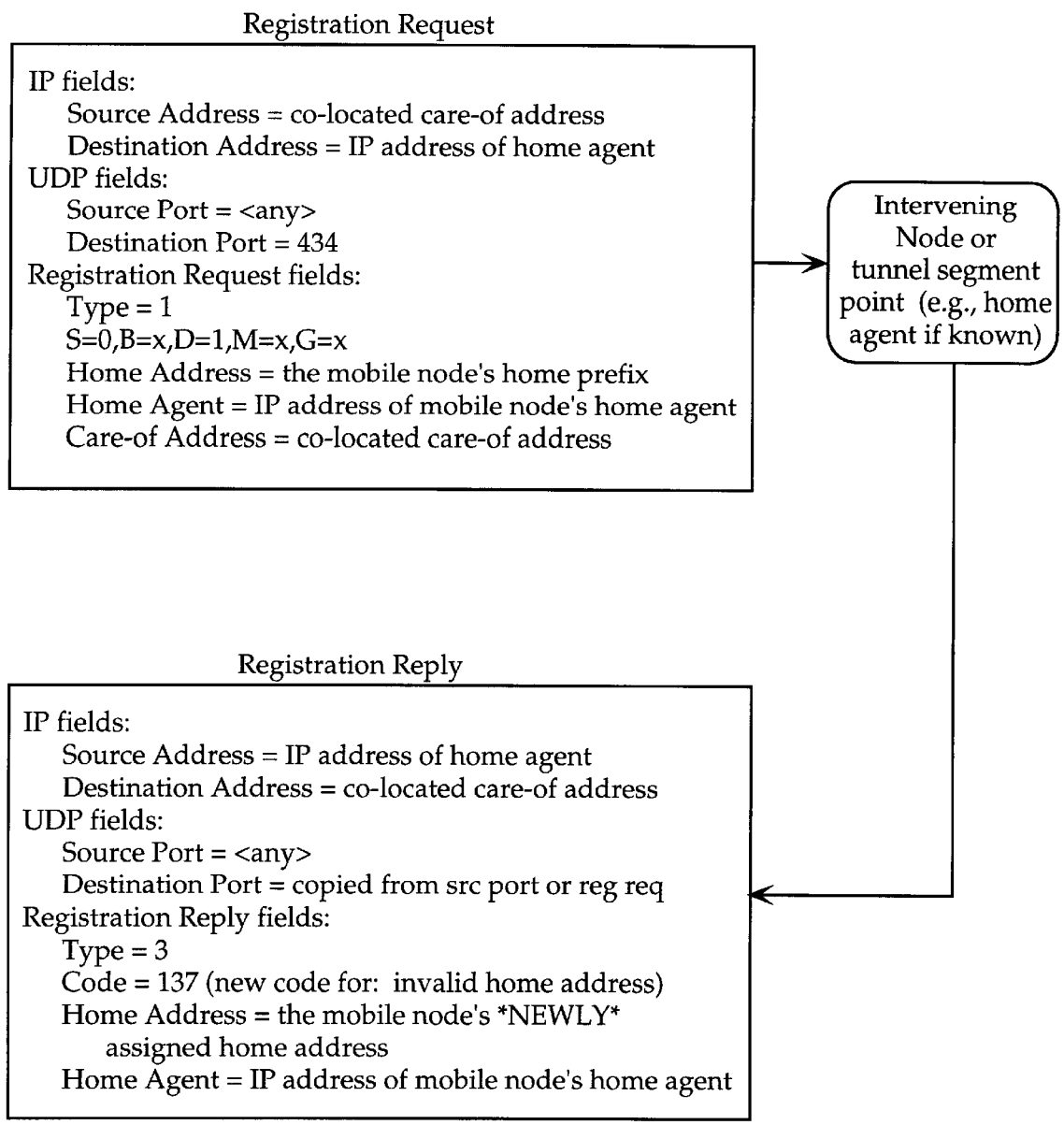
FIG. 5 illustrates a registration request and reply over the Internet according to one embodiment of the invention.

FIG. 5 illustrates a registration request and reply over the Internet according to one embodiment of the invention.

When a mobile node tries to register over the Internet, it may not know its home IP address, because it is booting a new TCP/IP session instead of resuming an already active one, or because its home IP address is dynamically assigned by the private net through DHCP (Dynamic Host Control Protocol). The mobile node might have obtained a new IP address by using an extended registration request. The requirement for remote booting might be to obtain an IP address from its "home" subnetwork, with the understanding that each remote boot could produce a different one. Network computers, for instance, typically are assigned an IP address upon booting, which is only valid for that boot session.

What is needed is a home IP address discovery mechanism akin to the home agent IP address discovery mechanism. In both cases, a registration denial would carry the necessary information. In order to achieve home IP address discovery, the invention, in one embodiment, defines a new error code: "invalid home address." "Invalid home address" can include both cases where:

1. The mobile node requires an address assignment from the subnet; or
2. The mobile node's lease (time for which use of the IP address was granted) on its previous address has expired.

In the "co-located" case where the MN is also its own FA, the MN temporarily acquires a topologically significant COA for use as a tunnel endpoint and thus the mobile node is directly addressable by the home agent and has a topologically significant COA address. In the co-located case, Assume:
*1. the home prefix is known
2. HA prefix is known
3. secret is known
4. care-of address is known
*5. care-of address is co-located In this case, what is desired is:
1. MN home address The home agent discovers that the home address field is not completely filled out, obtains a new address within the indicated prefix and returns that to the mobile node using the below reply. It is also possible to discover both the home agent and the mobile node address.

Assume:
*1. the home prefix is known
*2. HA prefix is known
3. secret is known
4. care-of address is known
*5. care-of address is co-located Want:
1. HA address
2. MN home address In each case, the registration request fields would contain:
Home Address=the mobile node's home prefix
Home Agent=directed broadcast to HA's prefix
Care-of Address=co-located care-of address In this registration request the home IP address (for the mobile node) has only the home prefix, and is thus an incomplete address. Recognizing this, the home agent will return the home IP address. However, before the home agent can do any assigning or passing of IP addresses back to the mobile node, the home agent address may also need to be discovered. An initial reply with code 137 (unknown home agent address) tells the mobile node which home agent to use. Subsequently, the mobile node may discover its own home address. The MN must first discover the home agent address because the latter must be willing to provide some address allocation services on the mobile node's behalf.

In another case, where there is no co-location, but a separate foreign agent,

Assume:

*1. the home prefix is known

*2. HA prefix is known 3. secret is known 4. care-of address is known

In this case, the foreign agent uses the identification field to determine which mobile node to send replies to. It is presumed that a foreign agent learn the mobile node MAC (Medium Access Control) address (which is a link layer address such as an ethernet address) from snooping the registration request. Nevertheless, it is difficult to implement a mobile node that sends registration requests (or any other traffic) before configuring its own address. Because of this, the co-located case is easier to implement, and would work very well over PPP (Point-to-Point Protocol).

The exemplary embodiments described herein are provided merely to illustrate the principles of the invention and should not be construed as limiting the scope of the invention. Rather, the principles of the invention may be applied to a wide range of systems to achieve the advantages described herein an to achieve other advantages or to satisfy other objectives as well.

What is claimed is:

1. A method for establishing remote access of a mobile node to a private network comprising:

creating a plurality of successive tunnel segments between said mobile node and said private network, each successive tunnel segment having a source endpoint and a destination endpoint;

creating a plurality of successively chained registration requests from each of the successive tunnel segments, wherein said plurality of successively chained registration requests are validated;

processing said successively chained registration requests in succession until a secure data transfer pathway is created between said mobile node and said private network, wherein a compound tunnel is composed from the plurality of successive tunnel segments;

pre-pending an information packet having a header for one or more successive tunnel segments with an additional header after said plurality of successively chained registration requests are validated, each additional header including an address for a source endpoint and an address for a destination endpoint for the next successive tunnel segment, wherein the last successive tunnel segment of said plurality of successive tunnel segments has its additional header stripped and has an information packet forwarded to its destination endpoint.

2. The method according to claim 1 wherein said data transfer pathway has a home agent as its endpoint in the private network.

3. The method according to claim 1 further comprising discovery of a home address of said mobile node.

4. The method according to claim 2 further comprising discovery of the home agent's address.

5. The method according to claim 1 wherein said creating said plurality of successively chained registration requests includes:

unwrapping each of the plurality of successively chained registration requests at the next tunnel segment until reaching a home agent, wherein said compound tunnel is formed as a result of said plurality of successively chained registration requests.

6. The method according to claim 5 further comprising:

providing a registration reply upon reaching said home agent;

if all registration fields are not complete then sending back to said mobile node the information and codes to complete a full registration request; and if all registration fields are complete, establishing said secure data transfer pathway.

7. The method according to claim 6 wherein said creating of successively chained registration requests by tunnel is repeated with said full registration request.

8. The method according to claim 1 wherein one tunnel segment is created by a foreign agent acting between said mobile node and said private network.

* * * * *